(12) United States Patent
Kaminsky

(10) Patent No.: US 6,295,342 B1
(45) Date of Patent: Sep. 25, 2001

(54) APPARATUS AND METHOD FOR COORDINATING USER RESPONSES TO A CALL PROCESSING TREE

(75) Inventor: Mark E. Kaminsky, Sunnyvale, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/030,728

(22) Filed: Feb. 25, 1998

(51) Int. Cl.⁷ .................................................. H04M 1/64
(52) U.S. Cl. ........................................ 379/88.23; 379/67.1
(58) Field of Search ............................ 379/71, 76, 88.16, 379/88.22, 88.23, 88.25, 90.01, 93.12, 93.25, 201, 67.1, 88.18; 704/270

(56) References Cited

U.S. PATENT DOCUMENTS

| | | | |
|---|---|---|---|
| 4,733,354 | | 3/1988 | Potter et al. ............................ 600/300 |
| 4,785,408 | * | 11/1988 | Britton et al. ......................... 704/270 |
| 5,357,427 | | 10/1994 | Langen et al. ......................... 600/300 |
| 5,442,693 | * | 8/1995 | Hays et al. ............................. 379/308 |
| 5,444,774 | * | 8/1995 | Friedes ................................... 379/266 |
| 5,530,950 | * | 6/1996 | Medan et al. ........................ 379/88.24 |
| 5,539,808 | * | 7/1996 | Inniss et al. ......................... 379/88.22 |
| 5,652,785 | * | 7/1997 | Richardson, Jr. et al. ........ 379/88.07 |
| 5,655,006 | * | 8/1997 | Cox, Jr. et al. ....................... 379/67.1 |
| 5,660,176 | | 8/1997 | Iliff ........................................ 600/300 |
| 5,671,269 | * | 9/1997 | Egan et al. ............................ 379/67.1 |
| 5,696,879 | * | 12/1997 | Cline et al. ........................... 704/260 |
| 5,771,276 | * | 6/1998 | Wolf ................................... 379/88.16 |
| 5,805,676 | * | 9/1998 | Martino .............................. 379/93.17 |
| 5,812,638 | * | 9/1998 | Muller ................................ 379/88.09 |
| 5,937,418 | * | 8/1999 | Ferris et al. ........................... 707/513 |
| 5,943,401 | * | 8/1999 | Risner et al. ....................... 379/88.22 |
| 5,953,393 | * | 9/1999 | Culbreth et al. .................. 379/88.25 |
| 6,014,626 | * | 1/2000 | Cohen ................................... 704/275 |

FOREIGN PATENT DOCUMENTS 0 633 682 A1   1/1995   (EP) .

OTHER PUBLICATIONS

IBM, Voice Mail Parser, IBM Technical Disclosure Bulletin, Oct. 1993, vol. 36, Iss. 10, pp. 587–588.*

* cited by examiner

Primary Examiner—Fan Tsang
Assistant Examiner—Roland G. Foster

(57) ABSTRACT

An apparatus and method for coordinating multiple user responses solicited from a user during a session with a call processing application includes receiving a first transmission from a user via a communication network, the transmission causing a voice channel control unit of an IVR unit to open a voice-form voice file. A first request is transmitted to the user, soliciting a first user response, the request being stored in a voice file database of the IVR unit. After receiving the first response, the first response is recorded into the voice-form voice file. A second request is transmitted to the user requesting a second user response. The second user response is appended to the voice-form voice file after it is received. A termination message is transmitted to the user informing the user that the current interaction with the IVR unit is complete. A system administrator configures the call processing application stored in an application database of the IVR unit. Voice files associated with mailboxes of the call processing application are stored in the voice file database accessible to the voice channel control unit.

19 Claims, 7 Drawing Sheets

APPARATUS AND METHOD FOR COORDINATING USER RESPONSES TO A CALL PROCESSING TREE

BACKGROUND OF THE INVENTION

The invention relates generally to a method and apparatus for managing a call processing tree. More specifically, the invention relates to a method and apparatus for coordinating user responses to a call processing tree to enable efficient transcription of the responses.

DESCRIPTION OF THE RELATED ART

Customer support, product support, and government services can often be most efficiently provided through an automated process. An automated call processing tree can be used to provide such services, enabling a user to access desired information or secure a desired service.

The call processing tree is configured by an administrator utilizing a system administration interface. Three different types of mailboxes available to the administrator in configuring the call processing tree for a particular application include a listen-only mailbox, a listen-respond mailbox, and a menu mailbox. These three mailbox types provide the administrator with considerable flexibility in configuring the call processing tree according to the administrator's needs.

The administrator utilizes a listen-only mailbox, a listen-respond mailbox or a menu mailbox at the first node in the call processing tree. The listen-only mailbox provides the user with a greeting, such as a welcome message. The listen-respond mailbox provides the user with a greeting that solicits a response from the user. The response is then recorded by the call processing application. The menu mailbox includes a greeting which directs the user to choose from a menu of options. The selection made by the user will then determine which mailbox will be accessed by the user next. The administrator is able to uniquely configure the call processing application by determining the sequence of mailboxes and the options available at the menu mailboxes. The listen-only mailbox is also utilized as a terminal mailbox in the call processing tree. A greeting is played, indicating that the user has come to the conclusion of the session with the call processing, and the call is disconnected.

Call processing applications have been utilized for a number of different purposes, ranging from providing airline flight arrival and departure information, automated banking services, technical support, and stock and bond quotations. A typical technical support call processing tree is utilized by a product support division of a computer company. A menu mailbox is accessed when the user connects to an Interactive Voice Response (IVR) unit supporting the call processing tree. The menu greeting requests the user to select the product for which technical support is required from a menu of products. A listen-respond mailbox might be utilized to collect information from the user regarding the place of purchase of the computer. A series of menu mailboxes is used to progressively narrow the scope of the user's technical problem until, ultimately, a solution to the problem is reached.

Although call processing applications are useful for providing technical support as described above, they currently are not well suited for such purposes as collecting information from a user to be processed to fill an order placed by the user. As a basic example, a call processing application might be configured to direct a call from a user to a first listen-respond mailbox which plays a greeting that asks the user the part number of the item which the user wishes to order. A second listen-respond mailbox then asks the user the quantity which the user wishes to order. A menu-mailbox then asks whether the user wishes to order any additional parts or not. If the user wishes to order more parts, the first mailbox is accessed again. If the user does not wish to order any more parts, a third listen-respond mailbox requests the user's credit card number. Finally, a listen-only mailbox plays a greeting indicating that the transaction is complete.

Listen-respond mailboxes of current call processing trees store their own responses. If a call processing tree designed for collecting user information employs multiple listen-respond mailboxes, as in the example above, it is difficult to correlate all of the responses of a single user. For instance, if in the example above twenty callers interact with the call processing tree and twenty responses are logged in the first mailbox, eighteen responses are logged in the second mailbox, and fifteen responses are logged in the third mailbox, a transcriber assigned to coordinate the responses of each user session is faced with a considerable challenge. The transcriber is forced to access each mailbox separately and correlate each order with the corresponding credit card number. Considerable work may be required to determine which of the users hung up prior to completing the transaction and which, if any, made more than one purchase order.

What is required is a method and apparatus for coordinating user responses to a call processing tree that enables efficient transcription of all responses of a user recorded in a single session with the call processing tree.

SUMMARY OF THE INVENTION

A method for coordinating multiple user responses solicited from a user during a single call session with an interactive voice response (IVR) unit includes receiving a first transmission from a user communication device via a communication network, the transmission causing the IVR unit to open a voice-form voice file. A first response request is transmitted to the user, soliciting a first user response. The first user response is recorded and subsequently appended to the voice-form voice file after the response is received from the user communication device. A second response request is transmitted to the user soliciting a second user response. After receiving the second user response, the second response is appended to the voice-form voice file. In a preferred embodiment, a separator is appended to the voice-form voice file before appending the second response. Upon completion of the session, a termination message is transmitted to the user which informs the user that the current session with the IVR unit is complete, and the address of the voice-form voice file is stored in a voice file database.

Information is provided to the transcriber regarding a current position in the voice form by a voice form comment mailbox whose greeting is appended to the voice form when processing of the call processing tree reaches that mailbox. In a preferred embodiment, the greeting is a message, typically recorded by the administrator who set up the call processing tree, which provides information to a transcriber regarding a mailbox either preceding or subsequent to the voice-forms comment mailbox. For instance, the greeting might indicate a user selection in a menu mailbox. In this manner, a transcriber is assisted in tracking the path of a user through a call processing tree.

An IVR unit capable of coordinating multiple user responses solicited from a user during a session with the IVR unit includes a user interface configured to transmit command signals in response to a transmission received from a remotely located communication device. Execution of the instructions enables the user to traverse through multiple mailboxes of the call processing application supported by the IVR unit. The command signals include a create voice file command, an append voice information to voice file command, a play voice file command, and a save voice file command.

A voice channel control unit responsive to the command signals transmitted by the user interface is configured to create a new voice-form voice file in response to the create voice file command, to append user generated voice information into a voice-form voice file in response to the append voice information to voice file command, to play a voice-form voice file over the communication link in response to the play voice file command, and to save the voice file in response to the save voice file command.

An application database connected to the user interface includes memory for storing the call processing application, the application database being configured to transmit mailbox information to the user interface, including mailbox identity information and addresses of voice files associated with mailboxes of the call processing application.

A voice file database connected to the voice channel control unit is configured to store the voice-form voice file in response to a save command signal from the voice channel control unit and to recall the voice-form voice file on command so the voice file can be played.

A preferred embodiment of the IVR unit includes random access memory (RAM) connected to the voice channel control unit for temporarily storing the address of the voice-form voice file until the voice-form voice file is closed. The RAM is also configured to store voice-form status data, indicating whether the system is in an open voice-form state or a closed-voice-form state. The preferred embodiment further includes a voice-forms comment mailbox in the call processing application which includes a greeting recorded by an administrator identifying a previous menu selection made by a user or a mailbox accessed by the user.

DETAILED DESCRIPTION

Figure 1:
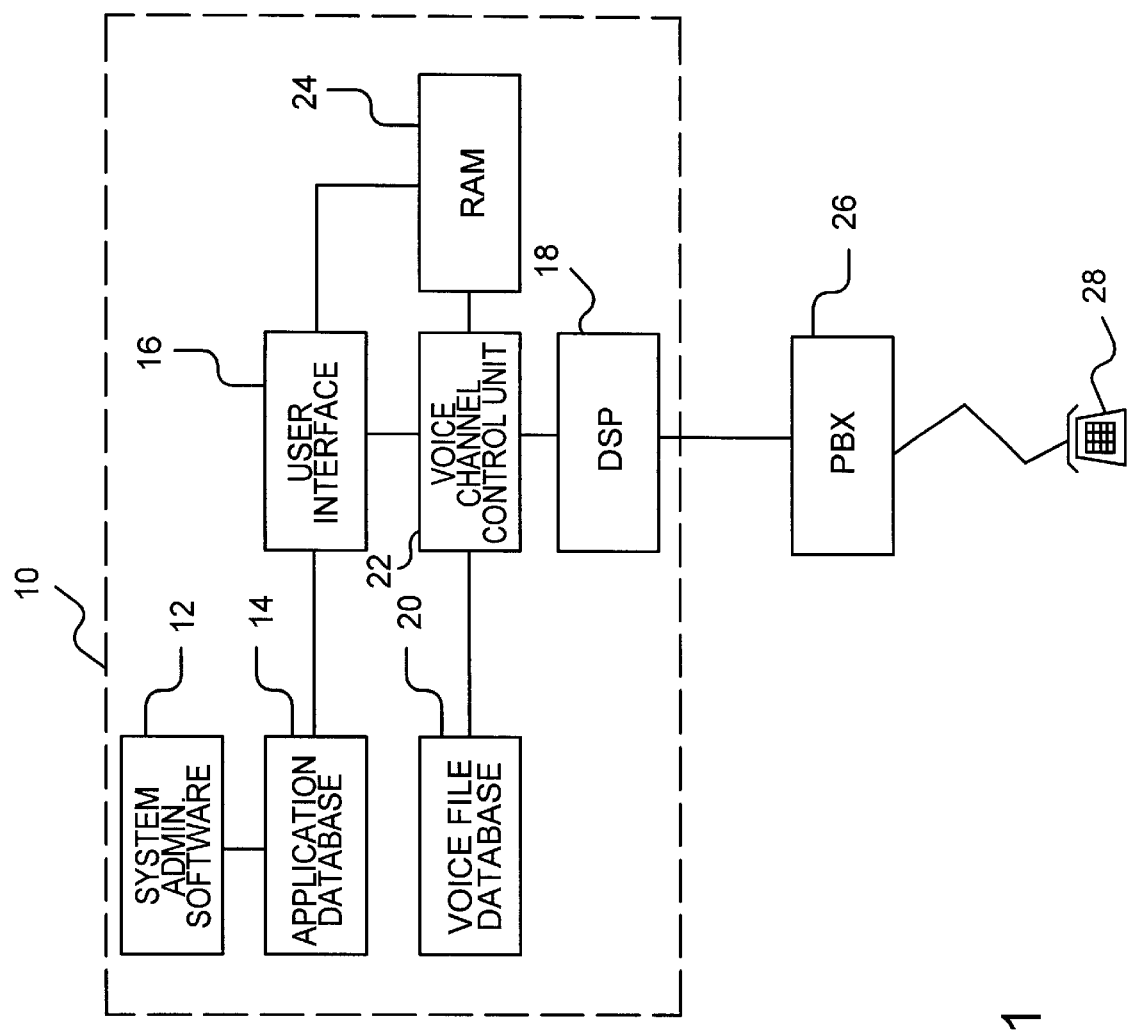
FIG. 1 is a block diagram of an IVR unit with user response coordinating capability according to the invention.

With reference to FIG. 1, an IVR unit 10 according to the present invention includes system administration software 12 that enables an IVR administrator to configure a call processing application and store the application in an application database 14. The IVR administrator can also utilize the system administration software 12 to retrieve a previously configured application and modify the application.

As will be discussed more fully below, the call processing application consists of multiple interconnected mailboxes, with each mailbox including a greeting. The system administration software 12 is utilized to establish the configuration of the mailboxes. The IVR administrator has flexibility to configure a call processing application in any manner the administrator desires, subject only to the rules governing the various types of mailboxes discussed below.

The application database 14 is connected to a user interface 16, enabling the user interface to access call processing application information necessary to navigate a user through a call processing tree supported by the call processing application. A digital signal processor (DSP) 18 is connected to a private branch exchange (PBX) 26, which provides the IVR unit 10 with its telephony. A user telephone 28 is able to access the IVR unit via the PBX 26. The DSP 18 converts signals transmitted by the user telephone into a format capable of being processed by the voice channel control unit 22. For instance, if the user telephone 28 is an analog telephone, the DSP 18 converts the dual tone multifrequency (DTMF) signals transmitted by the user telephone into digital signals formatted for processing by the voice channel control unit 22. Instead of being supported by the PBX 26, the IVR unit can alternatively be supported by a central office of a telephone company (not shown).

A user interface 16 is connected to the voice channel control unit 22 to allow the user interface 16 to transmit commands to and receive events from the voice channel control unit 22. The user interface 16 responds to a call from the user telephone 28 by accessing data from the application database 14 regarding the call processing tree. This data includes the next mailbox in the call processing tree, addresses of voice files associated with the mailbox, and the maximum interval of silence during a recording of a user response before a silence time-out function is triggered. The user interface 16 transmits commands to the voice channel control unit 22 based upon the call processing data accessed from the application database 14. The voice channel control unit 22 responds to the commands by handling voice files stored in a voice file database 20. The voice files stored in the voice file database 20 include greeting voice files which store the greetings associated with the mailboxes of the call processing tree. Local RAM 24 provides storage for temporary voice files into which user responses are recorded. The RAM 24 also stores system state information, which indicates whether a voice-form voice file of the call processing application is open.

Figure 2:
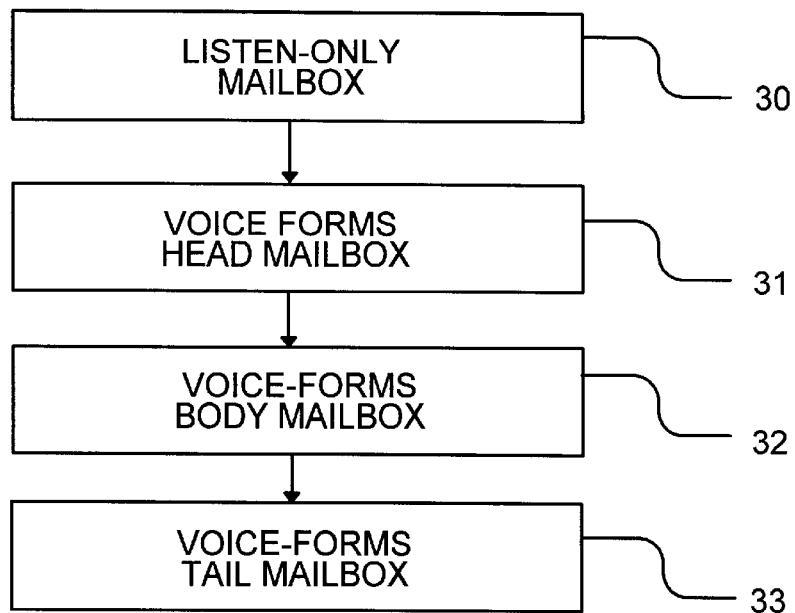
FIG. 2 is a block diagram of a simple call processing tree supported by the IVR unit of FIG. 1.
Figure 3:
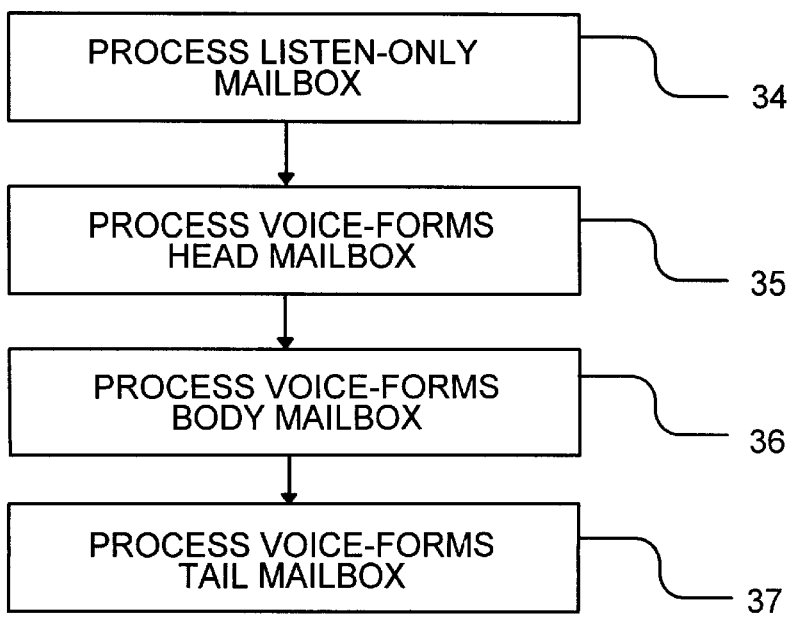
FIG. 3 is a process flow of a method for processing the call processing tree of FIG. 2.

Referring to FIGS. 2 and 3, a simple call processing tree supported by the IVR unit 10 includes a listen-only mailbox 30 as an entry point. The processing 34 of the listen-only mailbox includes playing the greeting of the listen-only mailbox and time-out transferring to a voice-forms head mailbox 31. The voice-forms head mailbox 31 is processed 35 by playing the voice-forms head mailbox greeting, opening a voice form, recording a user response into that voice form, and transferring to a voice-forms body mailbox 32. Processing 36 the voice-forms body mailbox 32 includes playing a voice-forms body mailbox greeting, recording a user response, appending the user response to the voice form, and transferring to a voice-forms tail mailbox 33. The voice-forms tail mailbox 33 is processed 37 by playing the voice-forms tail mailbox greeting, closing the voice form, and then disconnecting the line to the user.

Figure 4:
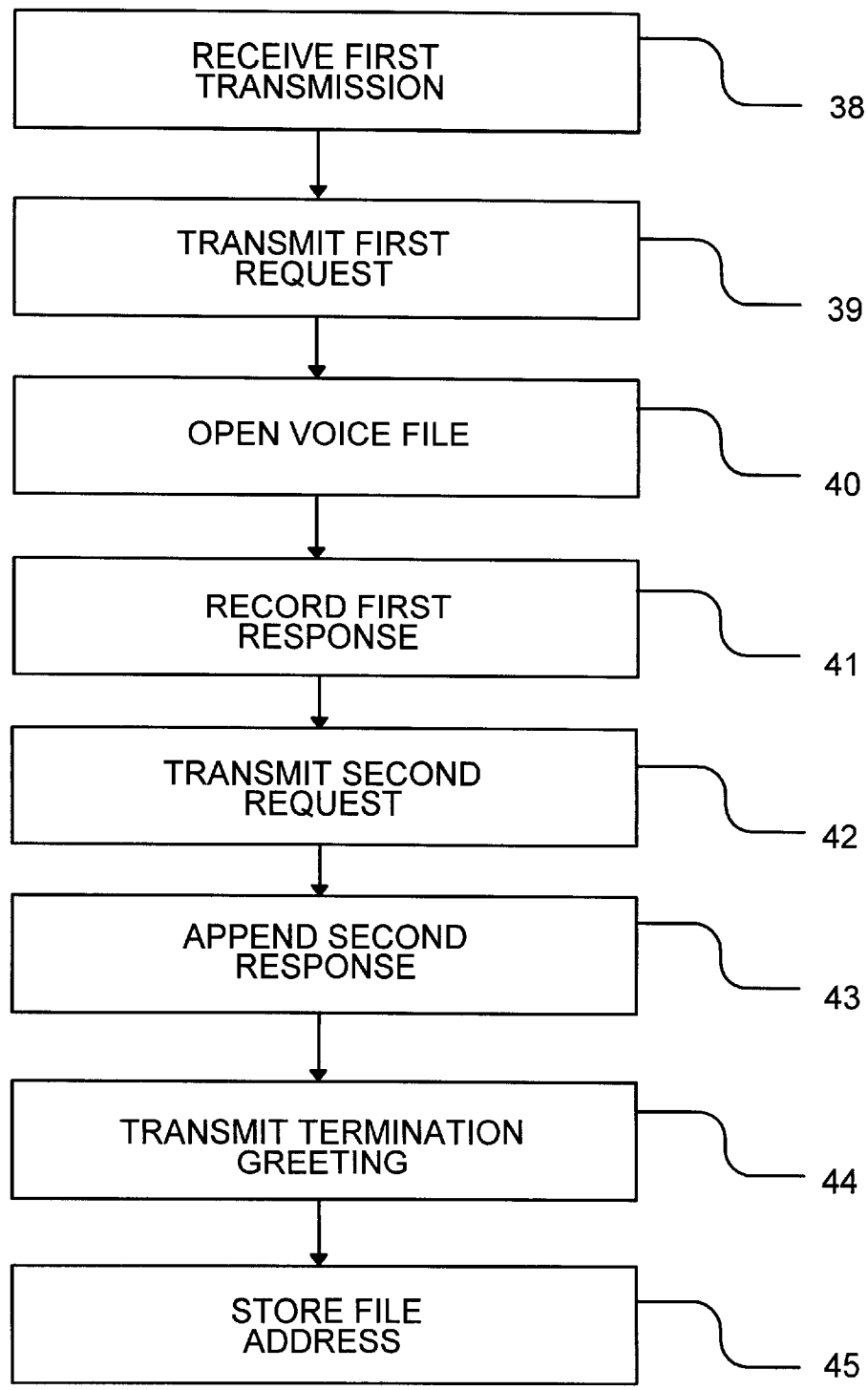
FIG. 4 is a process flow of a method for coordinating multiple user responses solicited from a user during a session with an IVR unit.

Referring to FIG. 4, a method for coordinating multiple user responses solicited from the user during a session with the IVR unit 10 includes receiving a first transmission, for instance a phone call, from the user telephone 28 in step 38. The user interface 16 accesses data from the application database 14 which includes the address of a greeting associated with the first mailbox of the call processing tree. The first mailbox might be a listen-only mailbox which plays a greeting and transfers the user to a voice forms head mailbox. An important feature of the voice-forms head mailbox is that it opens 39 a voice form to which a user response is appended. The voice-forms head mailbox leaves the voice form open to allow further user responses to be appended.

The user interface 16 accesses the address of the voice-forms head mailbox greeting from the application database 14 and transmits a command to the voice channel control unit 22 to access and play the voice-forms head mailbox greeting. In step 39, the greeting is transmitted to the user. In step 41, the first user response is recorded into a voice-form voice file after the voice channel control unit 22 has opened 40 the voice-form voice file and the IVR unit has received the response. The user interface 16 closes the voice-form voice file and accesses the address of a voice-forms body mailbox greeting and transmits a command to the voice channel control unit 22 to access the greeting for the voice-forms body mailbox and to play the greeting. The voice-forms body mailbox has a greeting containing a request for a second user response. The second greeting that contains the second request is then transmitted to the user in step 42.

The voice channel control unit 22 records the second user response into a temporary voice file. After receiving the second response, the voice channel control unit then notifies the user interface 16 that recording is complete. In a preferred embodiment, the user interface 16 accesses the address of a separator and transmits a command to the voice channel control unit 22 to append the separator to the voice form. The user interface 16 then transmits a command to the voice channel control unit 22, which moves the second response from the temporary voice file and appends 43 the second response to the voice-form voice file. The user interface 16 accesses the address of a voice-forms tail mailbox greeting which includes a message informing the user that the current session with the IVR has been completed. The user interface 16 transmits a command to the voice channel control unit 22 to play the greeting, which is transmitted to the user in step 44. In step 45, the address of the voice-form voice file is stored in the voice-forms head mailbox in the application database 14.

Figure 5:
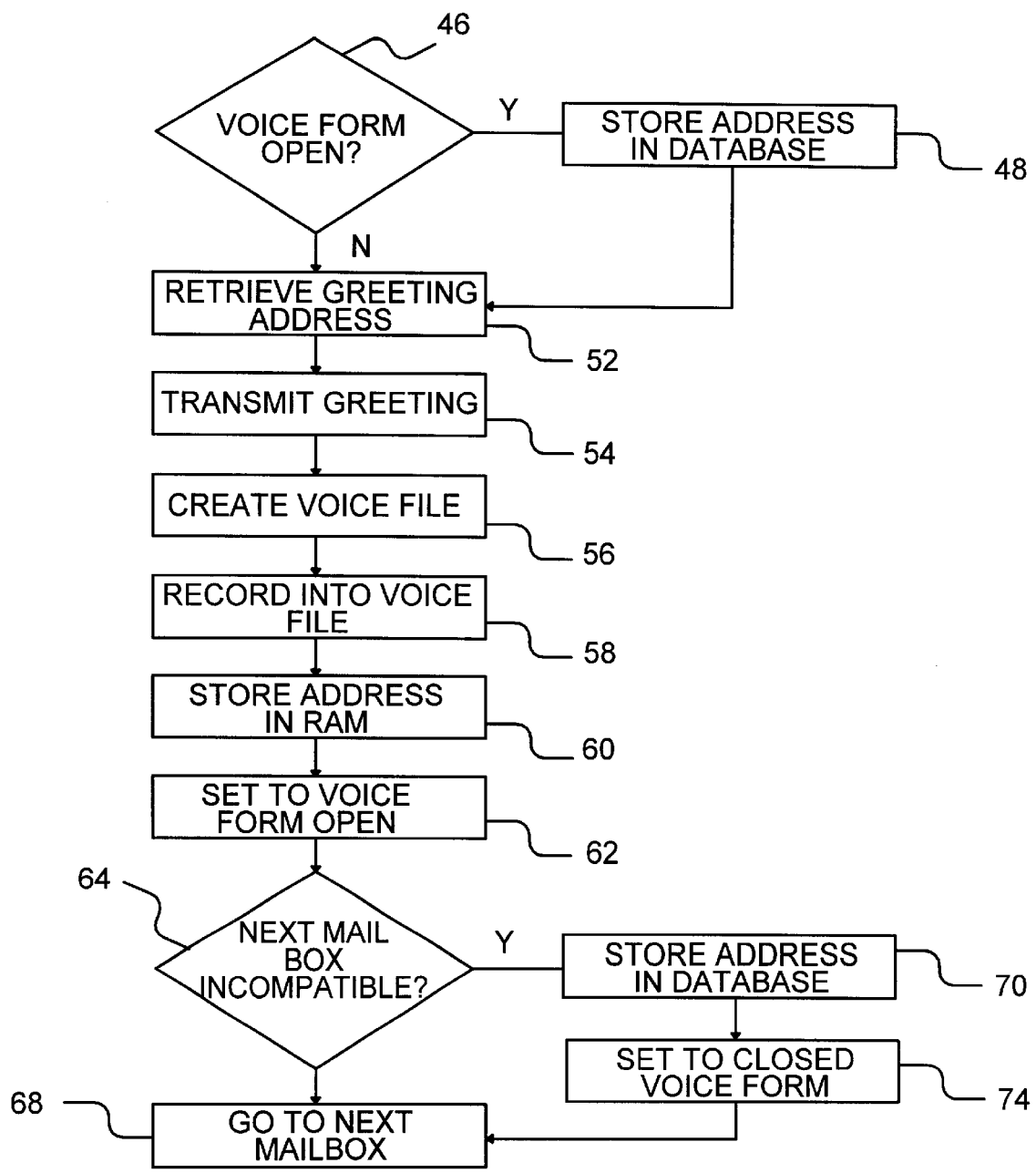
FIG. 5 is a process flow of a method for processing a voiceforms head mailbox in a call processing application according to the invention.

With reference to FIG. 5, a method for processing a voice-forms head mailbox includes determining whether a voice-form is currently open in step 46. A system is set to an open voice-form state to indicate the presence of the open voice-form. The open voice-form state is incompatible with certain types of mailboxes, a voice-forms head mailbox being one of the incompatible mailbox types. A voice-forms head mailbox is incompatible with an open voice-form state because the previous voice-form must be closed before a new voice-form can be opened. Consequently, if a voice-forms head mailbox is accessed while the call processing application is in an open voice-form state, in step 48 the address of the voice-form voice file associated with the previous voice form is stored in the application database 14.

If in step 46 it is determined that the system is set to a closed voice-form state, step 48 is bypassed. In step 52, the user interface 16 accesses the address of the voice-forms head mailbox greeting which includes a general response request. The user interface 16 transmits a command to the voice channel control unit 22 to play the voice-forms head mailbox greeting and, in step 54, the greeting is transmitted to the user. The user interface 16 transmits a command to the voice channel control unit 22 to create a voice file. In step 56, the voice channel control unit 22 creates a voice-form voice file to which user responses can be appended.

The user interface 16 transmits a record into voice file command and, in step 58, the voice channel control unit 22 records the user response into the voice-form voice file. In step 60, the address of the voice-form voice file is stored in the RAM 24. In step 62, the system is set to an open voice-form system state and the system state data is stored in the RAM 24. If an interruption in the power supply is experienced while the system is in open voice state, the address of the voice-form voice file will be lost. To avoid this consequence, a non-volatile memory such as non-volatile random access memory (NVRAM), not shown, can be substituted for the RAM 24.

In step 64, it is determined whether the next mailbox in the call processing tree is incompatible with the open voice-form system state. As noted above, opening a voice-forms head mailbox is incompatible with an open voice-form system state, although it is unlikely that a call processing tree would intentionally be configured to include two consecutive voice-forms head mailboxes. Another possibility is that the next mailbox is a listen-respond mailbox of a prior art call processing application. These mailboxes record their own responses and, consequently, are incompatible with an open voice-form mailbox.

If, in step 64, it is determined that the next mailbox in the call processing tree is incompatible with the open voice-form system state, the address of the voice-form voice file is stored in the application database 14 in step 70 and the system is set to voice-form closed state in step 74. In step 68, the user interface 16 proceeds to the next mailbox.

Figure 6:
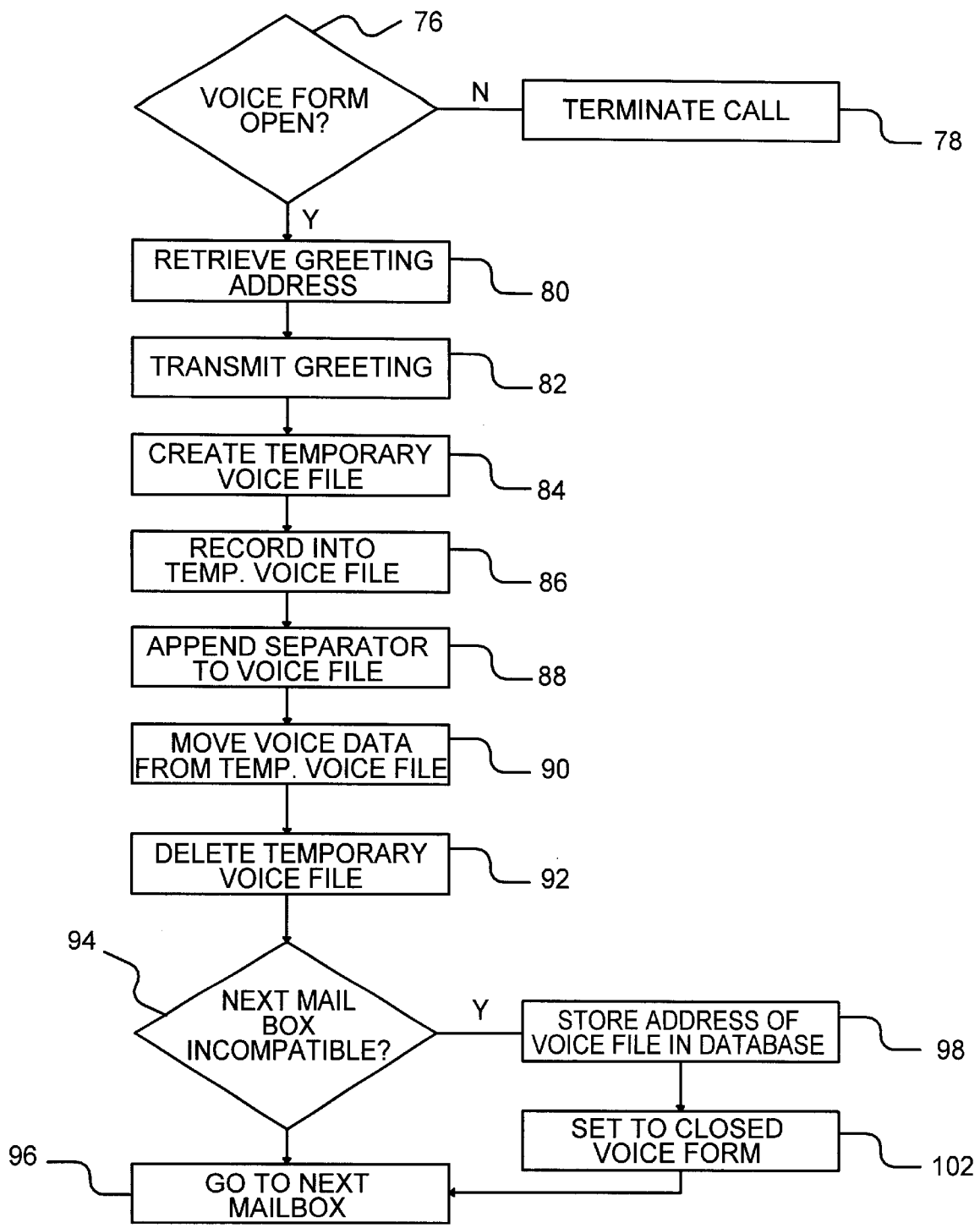
FIG. 6 is a process flow of a method for processing a voiceforms body mailbox.

Referring to FIG. 6, a method for processing a voice-forms body mailbox is illustrated which includes determining whether the system state is set to open voice form in step 76. If the system state is set to voice-form closed, then in step 78 the call is terminated. If the system state is set to voice-form open, the user interface 16 retrieves the address of a voice-forms body mailbox greeting from the application database 14 in step 80. The user interface 16 transmits a command to the voice channel control unit 22 to play the greeting which is then transmitted in step 82 to the user. The voice channel control unit 22 creates a temporary voice file in step 84 into which a user response will be recorded. In step 86, upon receiving the user response transmitted by the user telephone 28, the voice channel control unit 22 records the response into the temporary voice file stored in the RAM 24.

The voice channel control unit 22 appends a separator tone to the voice-form voice file in step 88 prior to moving the user response from the temporary voice file to the voice-form voice file. The separator tone serves to provide a break between user responses, so that a transcriber is better able to discern the end of one user response and the beginning of the next response. Alternatively, the separator tone can be stored in the voice-form voice file after each user response. In step 90, the voice channel control unit 22 moves the voice data from the temporary voice file into the voice-form voice file and, in step 92, the temporary voice file is deleted.

In step 94, it is determined whether the next mailbox in the call processing tree is incompatible with the open voice-form system state. Mailboxes which may follow a voice-forms body mailbox in a voice-form application include another voice-forms body mailbox, a voice-forms comment mailbox, a listen-only mailbox, a menu mailbox, and a voice-forms tail mailbox. If the next mailbox is incompatible with the open voice form, the address of the voice-form voice file is stored in the application database in step 98, and the system state is set to closed voice form in step 102. The next mailbox is accessed in step 96.

Figure 7:
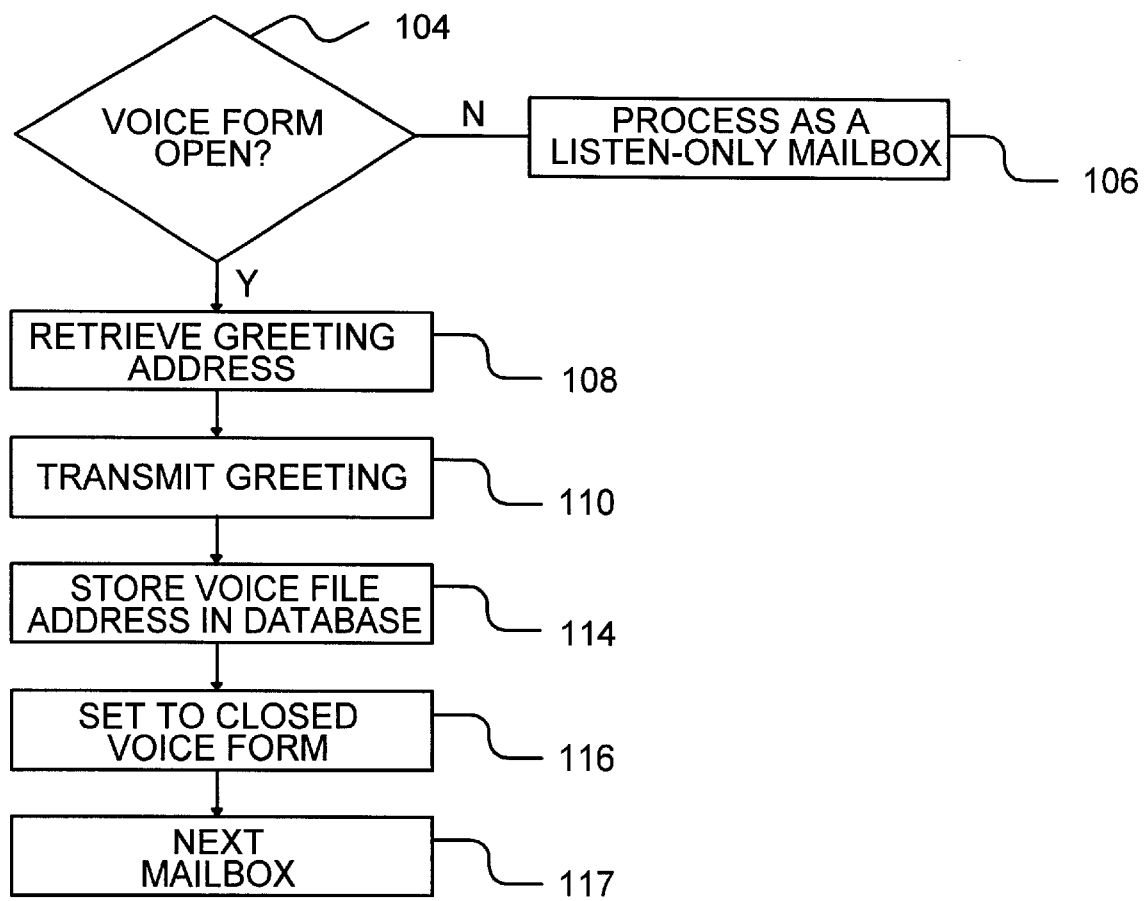
FIG. 7 is a process flow of a method for processing a voiceforms tail mailbox.

Referring to FIG. 7, a method for processing a voice-forms tail mailbox includes determining whether the system state is set to open voice form in step 104. The voice-forms tail mailbox is positioned at the end of a voice form in a call processing tree and is utilized to communicate to the user that the current voice form is complete. If the system state is set to closed voice form, in step 106 the voice forms tail mailbox is treated as a listen-only mailbox and the processing continues.

If the system state is set to voice-form open, in step 108 the user interface 16 retrieves the voice-forms tail mailbox greeting address from the application database 14. The user interface 16 transmits a command to the voice channel control unit 22 to play the greeting which is transmitted to the user in step 110. The address of the voice-form voice file is stored in the application database 14 in step 114, and in step 116 the system state is set to closed voice form, and in step 117 the next mailbox is accessed.

Figure 8:
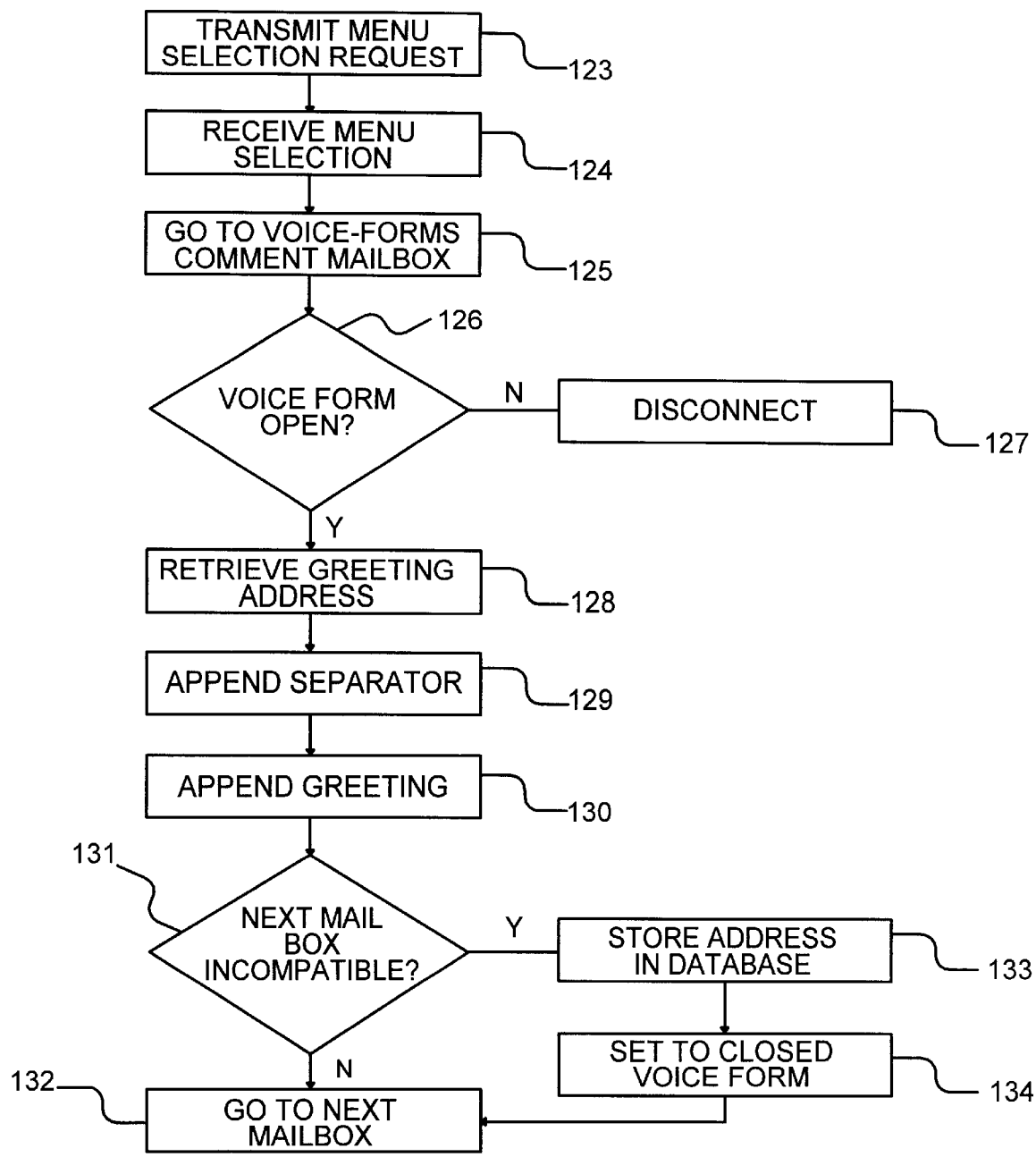
FIG. 8 is a process flow of a method for processing a voiceforms comment mailbox.

Turning to FIG. 8, a method for processing a voice-forms comment mailbox is illustrated. The voice-forms comment mailbox facilitates transcription of the user responses by providing a greeting which the system administrator records to provide information to the transcriber. The greeting is not audible to the user and, in a preferred embodiment, the processing of the voice-forms body mailbox is transparent. In an alternative embodiment, the user experiences a brief silence while the greeting is appended to the voice form. A typical use of the voice forms comment mailbox is to indicate the choice made by a user in response to a menu mailbox. For example, a menu mailbox might include a greeting requesting the user to select from a menu of options by pressing "1" for information on car insurance, "2" for information on home owner's insurance, or "3" for information on health insurance. A person transcribing the user responses appended into a voice-forms head mailbox is required to infer the selection made by the user in the menu mailbox if no voice-forms comment greeting is appended to the voice-form voice file. The task of inferring the user selection can prove to be time consuming if numerous menu mailboxes are utilized in a call processing application.

The voice-forms comment mailbox can also be utilized to identify a preceding or subsequent voice forms body mailbox. If a call processing tree has numerous consecutive mailboxes, the appended greeting identifying a mailbox assists a transcriber in keeping track of the user responses.

With continued reference to FIG. 1, the method for processing a voice-forms comment mailbox includes transmitting 123 a menu selection request to a user, and in response receiving 124 a menu selection from the user. Continuing with the example above, a user might select information of health insurance by pressing "3" on the keypad of the user's telephone 28.

In response to the selection of the user, the voice channel control unit 22 directs 125 the user to a voice-forms comment mailbox having a greeting which reflects the user's selection of health insurance information. This voice-forms comment mailbox greeting, when appended to the voice-form voice file, enables a transcriber of the voice form responses to identify the user's selection of health insurance information.

The voice channel control unit 22 determines whether the system state is set to open voice form in step 126. If the system state is not set to open voice form, the user is disconnected from the IVR unit 10 in step 127. In an alternate embodiment, if the system state is not set to open voice form, a voice forms comment mailbox is simply skipped and the next mailbox in the call processing tree is accessed. If a voice form is open, in step 128 the user interface 16 retrieves the address for the voice-forms comment mailbox from the application database 14. A separator tone is appended to the voice-form voice file in step 129. The greeting, as recorded by the administrator, is appended to the voice-form voice file in step 130. Although the greeting is not audible to the user, it should be kept as brief as possible, because, if the processing of the voice-forms comment mailbox is not transparent to the user, the user is kept on the line awaiting the greeting for the next mailbox while the greeting is being appended to the voice-form voice file.

In step 131, the determination is made whether the next mailbox in the call processing tree is incompatible with the voice-form open system state. If the next mailbox is compatible, in step 132 the next mailbox in the processing tree is accessed. If the next mailbox is incompatible with the open voice-form state, the voice-form voice file address is stored in the voice file database 20 in step 133, and the system state is set to closed voice form in step 134 prior to accessing the next mail box.

The above-described invention facilitates efficient transcription of multiple user responses solicited during a user session with an IVR unit 10 by appending the user responses to a single voice-form voice file and storing the voice-form voice file address in a voice-forms head mailbox. The ability to access all the user responses in one mailbox instead of accessing each response separately in a different mailbox provides a dramatic increase in efficiency for transcribing the responses.

What is claimed is:

1. A method for coordinating multiple user responses solicited from a user during a session with an interactive voice response (IVR) unit comprising the steps of:

receiving a first transmission from a user communication device via a communication network;

as a response to said first transmission, determining whether a system state is set to open voice-form, said open voice-form system state indicating the existence of a currently open voice-form source file;

opening a first voice-form voice file in response to receiving said first transmission and determining that said system state is not set to open voice-form, said first voice-form voice file having an unspecified size;

transmitting a first response request from said IVR unit to said user, thereby soliciting a first user response;

recording said first user response into said voice-form voice file after receiving said first user response from said user communication device;

transmitting at least one second response request from said IVR unit to said user, thereby soliciting at least one second user response;

appending each said second user response to said voice-form voice file after receiving each said second user response from said user communication device such that said voice-form voice file is a continuous file;

transmitting a termination greeting to said user, said termination greeting informing said user that a current session between said user and said IVR unit is complete; and storing a single address of said voice-form voice file in an application database.

2. The method of claim 1 further comprising the step of storing an address of said voice-form voice file in local memory separate from said application database.

3. The method of claim 2 wherein said step of storing said address of said voice-form voice file in local memory includes storing said address in a non-volatile random access memory (NVRAM).

4. The method of claim 1 further comprising the steps of:

transmitting a menu selection request to said user with instructions to select from a menu of options;

receiving a menu selection from said user;

proceeding to a first voice-forms comment mailbox based upon said menu selection;

accessing a selection-indicator voice file in said first voice-forms comment mailbox, said voice-forms comment mailbox including a selection-indicator greeting indicative of said menu selection received from said user; and appending said selection-indicator greeting to said voice-form voice file.

5. The method of claim 4 further comprising the steps of appending a separator tone into said voice-form voice file prior to said step of appending each said second user response, and appending said separator tone to said voice-form voice file prior to said step of appending said selection-indicator greeting to said voice-form voice file.

6. The method of claim 4 further comprising the steps of appending a separator tone to said voice-form voice file after said step of recording said first user response into said voice-form voice file, appending said separator tone to said voice-form voice file after said step of appending each said second user response, and appending said separator tone to said voice-form voice file after said step of appending said selection-indicator greeting to said voice-form voice file.

7. The method of claim 1 comprising the further steps of:

after said step of appending each said second user response, proceeding to a second voice-forms comment mailbox including a voice file containing a mailbox identity message;

accessing said mailbox identity greeting; and appending said mailbox identity greeting to said voice-form voice file.

8. An IVR unit capable of coordinating multiple user responses solicited from a user during a session with said IVR unit comprising:

a user interface configured to transmit command signals in response to a transmission received from a remotely located user communication device, execution of instructions contained in said command signals enabling said user to traverse through a plurality of mailboxes of a call processing application supported by said IVR unit, said command signals including a create voice file command, an append voice information to voice file command, a play voice command, and a save voice file command;

a voice channel control unit configured to create a new voice-form voice file having an unspecified size in response to said create voice file command and to append user generated voice information into said voice-form voice file in response to said append voice information to voice file command such that said voice form voice file is a continuous file of a plurality of user responses submitted during a single call session, said control unit further being configured to play a voice file over the communication link in response to the play voice command, and to save said voice-form voice file in response to said save voice file command;

an application database connected to said user interface, said application database having memory storing said call processing application, said application database being configured to transmit mailbox information to said user interface including mailbox identity information and a single address of each voice file associated with said mailboxes of said call processing application; and a voice file database connected to said voice channel control unit, said voice file database being configured to store said voice-form voice file in response to said save command signal from said voice channel control unit such that said voice-form voice file is associated with a single address.

9. The IVR unit of claim 8 further comprising a digital signal processor configured to convert signals received from said remotely located user communication device into digital signals formatted to be compatible for processing by said user interface.

10. The IVR unit of claim 8 wherein said voice file database includes a separator tone voice file, said call processing application further being configured to append a separator tone to an unstored voice-form voice file between recorded user responses in said voice-form voice file.

11. The IVR of claim 8 further comprising random access memory (RAM) connected to said voice channel control unit, said RAM being configured to temporarily store said voice-form voice file until said voice-form voice file is closed.

12. The IVR unit of claim 11 wherein said RAM is non-volatile random access memory (NVRAM).

13. The IVR unit of claim 11 wherein said voice channel control unit is configured to store voice-form status data in said RAM, said voice-form status data including an open voice-form state and a closed voice-form state, said open voice-form state indicating the presence of an unstored voice-form voice file, said closed voice-form state indicating the absence of an unstored voice-form voice file.

14. The IVR unit of claim 8 further comprising a system administration program configured to enable an operator of said IVR unit to configure said call processing application and store said call processing application in said application database to meet the requirements of said operator.

15. The IVR unit of claim 8 wherein said call processing application includes a voice-forms comment mailbox, said voice-forms comment mailbox including a greeting voice file storing a greeting descriptive of one of a menu selection and a voice-forms body mailbox identity, said call processing application being configured to direct said voice channel control unit to append said greeting in said greeting voice file into said voice-form voice file.

16. A method for coordinating multiple user responses solicited from a user during a session with an IVR unit comprising the steps of:

receiving a transmission from a remotely located user communication device;

determining whether a system state is set to open voice form indicating the presence of a first unstored voice-form voice file;

storing an address of said unstored voice-form voice file if said system state is set to open voice form;

accessing a first greeting to be transmitted to said user from a voice-forms head mailbox in a voice file database, said first greeting including a request for a first user response;

creating a second voice-form voice file;

recording said first user response to said request into said second voice-form voice file;

setting a system state to voice-form-open;

accessing a second greeting of a voice-forms body mailbox from said voice file database, said second greeting including a second request for a second response from said user;

appending said second response into said second voice-form voice file after receiving said second response from said user such that said second voice-form voice file is a continuous file;

accessing a third greeting in a voice-forms tail mailbox stored in said voice file database, said third greeting including a session termination message;

transmitting said session termination message to said user;

storing a single address of said second voice-form voice file in said voice-forms head mailbox; and setting said system state to voice-form-closed.

17. The method of claim 16 further comprising the steps of appending a separator tone to said second voice-form voice file after said step of recording said first response and appending said separator tone to said second voice-form voice file after said step of appending said second response.

18. The method of claim 16 further comprising the steps of appending a separator tone to said voice-form voice file after said step of recording said first user response into said voice-form voice file, appending said separator tone to said voice-form voice file after said step of appending each said second user response, and appending said separator tone to said voice-form voice file after said step of appending said selection-indicator greeting to said voice-form voice file.

19. The method of claim 16 further comprising the steps of:

accessing a fourth greeting contained in a menu mailbox, said fourth greeting including a menu of options and directions to said user to select from said menu;

receiving a response from said user including a user selection from said menu;

accessing a fifth greeting in a voice-forms comment mailbox from said voice file database, said fifth greeting including an identification of said user selection; and appending said fifth greeting to said second voice-form voice file.

\* \* \* \* \*